United States Patent [19]

Jensen

[11] 4,345,035

[45] Aug. 17, 1982

[54] METHOD OF PRODUCING MOLTEN STONE MATERIAL IN A CUPOLA FURNACE

[75] Inventor: Leif Jensen, Olstykke, Denmark

[73] Assignee: Rockwool International A/S, Hovedgaden, Denmark

[21] Appl. No.: 232,780

[22] Filed: Feb. 4, 1981

[30] Foreign Application Priority Data

Feb. 14, 1980 [DK] Denmark .............................. 631/80

[51] Int. Cl.³ ............................................ C03C 13/00

[52] U.S. Cl. ........................................ 501/29; 501/36

[58] Field of Search .................. 501/36, 35, 29; 45/18

[56] References Cited

U.S. PATENT DOCUMENTS 2,467,889 4/1949 Harter et al. ........................ 501/36

*Primary Examiner*—James Poer

*Attorney, Agent, or Firm*—Lawrence Rosen

[57] ABSTRACT

Method of producing a melt from rock materials in a cupola furnace which materials are charged as uniformly-shaped briquettes together with coke. In order to recue the content of CO in the exhaust and to increase the melting capacity of the furnace, the flow of combustion air related to the cross-section of the furnace is at least 60 $Nm^3/m^2$ minute, and the briquettes having such a shape that a porosity in the combustion zone is more than 0.45.

3 Claims, No Drawings

METHOD OF PRODUCING MOLTEN STONE MATERIAL IN A CUPOLA FURNACE

The invention relates to a method according to the introductory part of the main claim.

Melting of stone or rock materials in a cupola furnace is connected with a series of problems, which are not known as such in melting of metals and especially iron. When the hot gas passes through the layers above the combustion- and melting zone, during which passage these layers are preheated by the heat from the gas, some of the carbon dioxide is reduced to carbon monoxide by means of a reaction with the coke in these layers. This provides a reducing atmosphere, which is useful for the melting of metals, but which is unimportant, when stone is molten, as the minerals are not to be reduced. The formation of carbon monoxide from carbon dioxide has the effect that the heat content of the coke is only partly used, and usually the fuel economy is poor. A content of carbon monoxide in the exhaust from the furnace of 20% is not unusual.

Another problem related to melting of stone is that droplets of molten materials have a tendency to be carried with the flow of combustion gas upward. Therefore, the air supply must be kept on a level where such upward transport does not take place. The relatively low velocity of the gas in the combustion zone and the adjacent zone above gives the gasses a good opportunity to react with the coke, which is not ignited. Owing to the low overall efficiency of the combustion the coke makes a large part of the charge, which correspondingly improves the conditions for the formation of the carbon monoxide.

These problems have been well known for a number of years and several solutions to the problem have been proposed, for example to provide the coke with a coating of mortar in order to protect the coke until it reaches the combustion zone, in which the mortar may act as a supplement to stone material to be molten. The method has not given such practical results that it has been accepted in practice.

The object of the invention is to provide a method of the above kind, by which the content of CO in the exhaust may be reduced, a reduced percentage of coke in the charge being obtained at the same time.

The method according to the invention is characterized by the features according to the characterizing clause of the claim.

By increasing the air supply compared with the amount presently being considered as the upper limit, an increase in the melting capacity is obtained as could be expected. However, the risk of a transport of droplets of the melt with the gas flow is reduced by the high porosity of the charge, as the velocity of gas in the interspaces between the briquettes is not increasing owing to high velocity. The increased gas flow through the furnace reduces the period of time in which the gasses may react with the unignited coke in the charge. The CO-content in the exhaust is thereby reduced by at least 50% compared with present standards. This surprisingly high improvement is among other factors due to a better efficiency in the combustion, whereby the percentage of coke in the charge may be reduced further, reducing the formation of carbon monoxide.

The porosity is defined as the porosity of a random-packed bed of uniformly-sized particles with a known sphericity. Sphericity is a coefficient calculated as the ratio between the volume of the briquettes and the volume of a sphere with the same surface area as that of the briquettes plus 25%. The supplement is serving to correlate the measured and the calculated heat transmission values between gas and briquettes and corresponds to the surface roughness of the briquettes.

A porosity of the size stated in the claim may in practice be obtained by means of uniformly-sized briquettes, by which the largest dimension is twice the average dimension perpendicular to the largest dimension. This means that briquettes with a parallelepipedic shape and with a square cross-section and a height twice the side of the square and with a rough and coarse surface will provide the charge with the required porosity in the furnace and, therefore, provide the necessary basis for the method according to the invention.

The preferred interval according to the invention for the gas velocity related to the cross-section of the furnace is 75–120 $Nm^3/m^2$minute (normal $m^3$ air per $m^2$ per minute).

According to an aspect of the invention it is preferable to provide a supplementary combustion air through secondary tuyeres above the combustion zone.

Secondary tuyeres are known from melting of iron in blast-furnaces as a means for saving coke, but is not known in connection with melting of stone materials, by which combustion of a gas with a high content may increase the temperature in the secondary zone to a level, at which new CO is formed from the coke in the charge.

According to the invention, by which the use of briquettes has reduced the CO-content in the hot gas to 4–6%, the risk of obtaining temperatures above melting temperature of the material and at which CO is formed is eliminated. An important feature of the addition of combustion air is that the content of hydrogen sulphide is reduced by 75%. The content of CO in the exhaust may be reduced to less than 2%.

The invention is further explained in the following by means of an example.

Mineral wool is manufactured by melting a stone material mainly comprising diabase and lime in a cupola furnace. In order to obtain a quick and complete melting, the stone material is charged in a weighed-out mixture of the components, which may be ground and formed into briquettes using for example cement as a binder. The stone material or the briquettes are charged together with coke into a cupola furnace, in which the melting takes place, and from which the molten stone is taken out to be formed into fibres by means of a cascade spinner, in which a thin stream of melt falls on the periphery of one or more fast rotating wheels.

The porosity of random-packed beds of uniformly-sized spheric particles is 0.3 to 0.35. Random-packed particles of different size will often have a smaller porosity as smaller particles will fill out interspaces between the larger particles. In normal operation of a cupola furnace charged with stone materials, it has not been possible to blow in combustion air through the tuyeres of the furnace at a rate of more than 30–50 $Nm^3$/minute $m^2$ (normal $m^3$ air per minute per $m^2$ of cross-section in the furnace) without transporting droplets of melt upwards by means of the air flow. This flow of air is much lower than the flows used in cupolas used for melting of for example iron, but for the above-mentioned practical reasons, the flow has been limited to the comparatively low figures.

In normal operation the percentage of coke in the charge is 15% in order to obtain the required temperature in the melting zone and the exhaust contains 10–20% carbon monoxide. The low rate of flow of combustion air limits the melting capacity of the cupola furnace, the normal capacity of a furnace with a diameter of 1.4 m being approx. 5000 kg/hour.

According to the invention the stone material is formed into briquettes of such a shape that randomly-packed in a bed the packing will have a porosity of 0.45. The average porosity may be calculated for uniformly-sized particles on basis of the sphericity of the particles, i.e. the ratio between the volume of each particle and a sphere with the same surface area as the particle, as the porosity of random-packed beds are a function of the sphericity (G. C. Brown and Associates, Unit Operations, John Wiley & Sons, New York, 1950). In the particular case it has been necessary to increase the area of the particles by 25% in order to obtain correlation between the calculated and measured values for heat transmission. The porosity as defined in the present specification is including this 25% increase in area.

Experiments with melting of stone materials made in a furnace having circular cross-section and a diameter of 1.4 m and charged with briquettes of a shape giving a porosity of the charge of 0.48 combined with an increase of the combustion air flow to 65 $Nm^3/m^2$ minute has reduced the carbon monoxide content in the exhaust to 5% and made a reduction of the percentage of coke in the charge by 20%, i.e. to 11.5% of the charge. At the same time the melting capacity of the furnace increased to 8000 kg/hour.

Simulations made by computer indicate that with a porosity in the interval between 0.45 and 0.50 and combustion air flows between 75–120 $Nm^3/m^2$ minute a further reduction takes place in the exhaust combined with a reduction of the percentage of coke in the charge by 40% compared with traditional operation.

Using a charge of briquettes of prismatic shape and hexagonal basis and a height which is twice the length of the side of the basis, the calculated porosity of the charge is 0.48%. Using different rates of the combustion air flow, the following relationship between consumption of coke, melting capacity and CO content in the exhaust is obtained.

| Air $Nm^3/min$ | Air $Nm^3/m^2min$ | Coke % | Melting capacity kg/h | Exhaust CO—% |
|---|---|---|---|---|
| 45 | 29 | 18.0 | 3000 | 20.8 |
| 75 | 49 | 15.4 | 5000 | 13.0 |
| 90 | 59 | 12.8 | 6328 | 6.9 |
| 120 | 78.5 | 9.0 | 10722 | 2.0 |

These results are confirmed by practical experiments as referred above.

Supplementary combustion air may be added through a set of secondary tuyeres placed above the combustion zone. Adding supplementary combustion air may both increase the melting capacity from 8000 kg/hour to 8800 kg/hour in the furnace referred to in the example. At the same time the CO-content in the exhaust may be eliminated. Further a reduction of the content of hydrogen sulphide in the exhaust is reduced. The flow through the secondary tuyeres was 10–15 $Nm^3/m^2$minute giving a total flow of combustion air of approx. 75 $Nm^3/m^2$minute.

I claim:

1. A method for producing a melt from briquettes of rocks, slags and/or other silicate materials and minerals, which comprises charging to a cupola furnace a mixture of or alternating layers of coke and said briquettes; characterized in that combustion air is supplied to a melting zone of the cupola furnace at a flow rate corresponding to at least 60 $Nm^3/m^2$ and that said briquettes have a uniform size, and a prismatic shape with a height not less than twice the average width.

2. Method according to claim 1, characterized in that supplementary combustion air is added through secondary tuyeres placed above the melting zone.

3. Method according to claim 2, characterized in that the total combustion air supply through the tuyeres is 75–110 $Nm^3/m^2$ minute.

* * * * *